UNITED STATES PATENT OFFICE.

JOHN A. CULLEN, OF WASHINGTON, DISTRICT OF COLUMBIA.

PROCESS OF TREATING ALKALI-METAL-SALT MIXTURES.

1,363,092.   Specification of Letters Patent.   Patented Dec. 21, 1920.

No Drawing.   Application filed March 26, 1919. Serial No. 285,299.

*To all whom it may concern:*

Be it known that I, JOHN A. CULLEN, a citizen of the United States, residing at Washington, in the District of Columbia, have invented certain new and useful Improvements in Processes of Treating Alkali-Metal-Salt Mixtures, of which the following is a specification.

This invention relates to a process intended for the treatment of alkali metal salt mixtures, especially such as contain, for example, the sulfates, chlorids, carbonates and bicarbonates of potassium and sodium, to recover therefrom commercial values both as primary products and as a by-product.

The process is intended particularly for the treatment of salt lakes or desiccated brines, occurring principally in Nebraska, New Mexico, Nevada and California, deposits which carry large amounts of values in the form of potassium and sodium compounds. Up to the present time, it has been the practice, particularly in Nebraska, to simply concentrate the brine without effecting a separation of the various components, thereby producing a crude product valuable only for fertilizing purposes because of the potash content.

According to the process hereinafter set forth, high grade potassium compounds suitable for use in the arts and sciences are obtained from these salt deposits and in addition a valuable by-product, specifically caustic soda, is recovered.

These natural brines are all alkaline in reaction although they vary considerably in composition; but despite the variability in composition, it is peculiar that if the sulfate and chlorin contents be calculated to the corresponding potassium salt, there is still an excess of potassium over these acid radicals, and to properly form a hypothetical combination it is necessary to combine the excess of the potassium with either part of the carbonate or bicarbonate radicals. Usually the chlorin content is low, averaging only about 2 to 3 per cent. of the total solids. It is too low in fact to attempt a separation and too low to be considered in the recovery process unless a chlorid is subsequently added in the manner and for the purpose hereinafter stated. A large percentage of the potassium is combined as the carbonate or bicarbonate, and since the solubilities of these and of the corresponding sodium salts are so nearly the same, fractional separation is impossible. The result has been that although many attempts have been made to separate the salts as they exist in solution, they have all, so far as I know, been failures.

The present invention comprises in its broad aspect the treatment of a solution of the salt mixture with an agent which will precipitate the carbonates, the concentration of the solution from which the precipitates have been removed, with the addition, either before or during concentration, of a predetermined amount of a substance which will furnish enough at least of an acid radical to insure that all of the potassium present in the salt mixture is satisfied with respect to that radical, and fractionally crystallizing out the potassium salts formed.

In my companion application, Serial No. 285298, filed of even date herewith, I have described and claimed a process of the foregoing character in which the required acid radical is furnished to the potassium by the addition of sodium sulfate. According to the present invention, the necessary amount of the acid radical is supplied by the employment of a haloid salt such as a chlorid, and specifically sodium chlorid. The chief difference in the results of the two processes is that whereas in the first the primary product is a sulfate of potassium, according to the present process the primary product is potassium chlorid.

In the course of a large number of tests, I have found that by adding slaked lime to a solution of the salt mixture, and thereby precipitating the carbonates and bicarbonates, the system is simplified and that through the formation of the highly soluble hydroxids, a separation is made possible, and, further, that upon the addition of a suitable salt such as sodium chlorid, in excess, an almost complete separation of the potassium is made possible and is recoverable as a valuable salt by concentration and crystallization.

In carrying out the process of my invention, I first carefully analyze the salt mixture. This may be done either before or after the precipitation of the carbonates and bicarbonates, but I prefer to analyze the solution for carbonates and bicarbonates before the addition of the precipitating agent, in order to get an accurate estimate of the amount of lime necessary. Since the precipitated calcium carbonate can be calcined and used over again, I prefer to analyze the solution for potassium, sulfates and chlorin after the addition of the lime, as the re-used lime will carry some values in potassium and sodium which will be returned therefore to the system. Consequently, an anaylsis after the lime is added will be more accurate and will of course give better results.

After the carbonates and bicarbonates have been precipitated by the calculated amount of the slaked lime and the necessary analysis made for the potassium, sulfates and chlorin content, a predetermined amount of chlorid, such as sodium chlorid, is added. This amount should be in excess of the amount theoretically required to satisfy the potassium in the solution not already combined as sulfate and chlorid.

The amount of sodium chlorid required may readily be calculated in the manner presently to be described. An analysis of one of these natural brines, which is typical, after precipitation of the carbonates and bicarbonates, shows the following content in grams per liter:

| | |
|---|---|
| Potassium (K) | 26.886 |
| Sodium (Na) | 23.871 |
| Sulfates ($SO_4$) | 20.812 |
| Chlorin (Cl) | 3.325 |
| Hydroxyl ions (OH) | 20.400 |

In employing sodium chlorid in accordance with the present invention, the first salt which crystallizes out from the solution after concentration is, as in the process of the companion application, glaserite, and this salt continues to form until practically all of the sulfates are precipitated. Therefore in calculating the amount of the chlorid to be added, this fact must be taken into consideration and the calculations made accordingly. The obvious procedure is to first calculate the amount of glaserite which will form from the known amount of sulfates in solution, which may be done from the equation:

$$a : a' = x : y,$$

wherein—
$a =$ the molecular weight of glaserite,
$a' =$ the molecular weight of the sulfate radical,
$x =$ the amount of glaserite which will form, and
$y =$ the known amount of $SO_4$ in solution.

Transposing the equation, $$ay = a'x$$

or, $$x = \frac{ay}{a'}$$

From the amount of double salt thus found, the amount of potassium it contains is calculated from the proportion:

$$m : m' = y : x,$$

in which—
$m =$ the molecular weight of glaserite,
$m' =$ the molecular weight of potassium in glaserite,
$y =$ the amount of double salt formed, and
$x =$ the amount of potassium.

Transposing the equation, $$m'y = mx$$

or, $$x = \frac{m'y}{m}$$

The amount of potassium thus found is subtracted from the total amount in solution and the chlorin content is next calculated to potassium chlorid by the following proportion:

$$n : n' = x : y,$$

in which—
$n =$ the atomic weight of potassium,
$n' =$ the atomic weight of chlorin,
$x =$ the amount of potassium to be combined with the chlorin, and
$y =$ the known amount of chlorin.

Transposing the equation, $$ny = n'x$$

or, $$x = \frac{ny}{n'}$$

The amount of potassium thus found is then subtracted from the balance found in the preceding equation and the amount of sodium chlorid necessary to furnish chlorin for the remainder of the potassium is calculated by the following equation:

$$P : P' = x : y,$$

in which—
$P =$ the molecular weight of sodium chlorid,
$P' =$ the molecular weight of potassium,
$x =$ the amount of sodium chlorid required, and
$y =$ the amount of potassium to be combined.

Transposing the equation, $$Py = P'x$$

or, $$x = \frac{Py}{P'}$$

In using the chlorid, any one of several procedures may be used. For example, the sodium chlorid may be added after precipitation of the carbonates and bicarbonates at any time during the evaporation before salt crystals appear. I find when this procedure is used, that up to about 30° to 31° B. (measured hot) no chlorids are precipitated except a very small amount, usually less than 1 to 2 per cent. and which is probably adhering mother liquor. I also find that if the solution be carried to this point under the above mentioned conditions, about 70 per cent. of the total amount of sulfates in the form of the double salt glaserite is precipitated. If the solution be carried to a concentration of about 32° B., about 85 to 86 per cent. of the sulfates is precipitated while the chlorin content is about 3 or 4 per cent. It is quite possible that at this point some solid chlorids are formed, although the increase in the chlorin content may be due to the increased concentration of chlorids in the mother liquor. At 34° to 36° B. and in fact from 32° on, solid potassium chlorid and sodium chlorid separate out with glaserite in about equal proportions. The yield of sulfates at this point is about 90 to 92 per cent. of the total and the yield of salt in between these points is usually but about 6 to 8 per cent. of the total solids in solution and if added to the crystals already obtained during the evaporation, the average analysis will show a chlorin content of about 4 to 5 per cent., which if washed once or twice with a small amount of water will be reduced to 1 or 2 per cent. The solution is then allowed to cool, when a high grade potassium chlorid is obtained.

Another procedure may be followed when it is desired to produce also a high grade sulfate almost entirely free of chlorin. This operation is substantially the same as that heretofore described, with the exception that the calculated amount of the chlorid is not added until the concentration reaches about 34° to 36° B., or until the solution has been drawn off and allowed to cool. As in the case when sodium chlorid is added before any solid forms during evaporation, so in this case there will be precipitated from the hot solution about 90 to 92 per cent. of the sulfates in the form of glaserite, and while it may prove desirable to cool the solution when the concentration reaches 34° to 36° B., I prefer for economic reasons to add the sodium chlorid if this procedure is used to the hot solution when the concentration is about 34° to 36° B. Since at 34° to 36° concentration solid sodium chlorid precipitates in small amounts, I prefer to cool the solution immediately after dissolution of the added salt is effected. Immediately upon the addition of the sodium chlorid, potassium chlorid starts separating and continues to do so until about 80 to 85 per cent. of the potassium in solution crystallizes in the form of a high grade chlorid of potassium.

Whichever procedure is used, the concentration may be carried to 40° B. with about the same result, provided the solids forming from 34° B. on to 40° B. are not removed but are allowed to stand in contact with the mother liquor during cooling and crystallization.

In order to insure recovery of practically all of the potassium remaining in solution after the maximum yield of the chlorid is obtained, and enabling the recovery of a high grade caustic soda from the mother liquor, it is desirable to add a small amount of sodium sulfate. The remaining amount of potassium is thereby recovered as glaserite.

The caustic mother liquor is decanted or filtered off and, if desired, evaporated to any suitable concentration. Since the original brine contains some organic matter which colors the solution a deep brown, it is preferable to evaporate the liquor resulting from the process to a point where but a small amount of water is present. The organic matter is thereby decomposed and coagulates around the sides of the evaporator. A very high grade and pure white caustic soda is obtained.

While in giving the foregoing examples, described so much in detail as to enable any one in the least skilled in the art to carry out the process, I have referred to specific substances, amounts and conditions, it is to be understood that I do not thereby intend to limit myself, since I fully realize that it is possible to carry out the process with some degree of success with considerable variation within the knowledge and contemplation of chemists familiar with the treatment of such materials.

Also, I have used in the claims the word "carbonates." This term is intended to include also the bicarbonates which are present.

While in the claims the step of precipitating the carbonates is described previous to the step of adding the salt, I do not thereby intend to limit myself to that particular sequence, since in carrying out the process the precipitation of the carbonates may occur during or after the addition of the salt.

I claim:

1. The process of treating solutions of natural potassiferous brines containing chlorids and carbonates, which comprises precipitating the carbonates with lime, adding a soluble haloid salt to furnish an acid radical for the potassium content of the brine not already combined with the radical, and recovering the potassium haloid by concentration and crystallization.

2. The process of treating solutions of natural potassiferous brines containing chlorids and carbonates, which comprises precipitating the carbonates with lime, adding a soluble chlorid to furnish the chlorin radical for the potassium content of the brine not already combined as the chlorid, and recovering the potassium chlorid.

3. The process of treating solutions of natural potassiferous brines containing chlorids and carbonates, which comprises precipitating the carbonates with lime, adding a soluble chlorid to furnish the chlorin radical for the potassium content of the brine not already combined as the chlorid, and recovering the potassium chlorid by concentration and crystallization.

4. The process of treating solutions of natural brines containing potassium chlorid and carbonates, which comprises precipitating the carbonates with lime, adding sodium chlorid to furnish the chlorin radical for the potassium content not already combined as the chlorid, and recovering the potassium chlorid.

5. The process of treating solutions of natural brines containing potassium chlorid and carbonates, which comprises precipitating the carbonates with lime, adding sodium chlorid to furnish the chlorin radical for the potassium content not already combined as the chlorid, and recovering the potassium chlorid by concentration and crystallization.

6. The process of treating solutions of natural brines containing chlorids and carbonates of potassium and sodium which comprises precipitating the carbonates, adding sodium chlorid to the solution in excess of the quantity required to furnish enough of the chlorin radical to satisfy the potassium content not already combined as the chlorid, and recovering the potassium chlorid by concentration and crystallization.

7. The process of treating solutions of natural potassiferous brines containing chlorids and carbonates, which comprises precipitating the carbonates, concentrating the solution and adding during concentration a soluble chlorid to furnish the chlorin radical for the potassium content of the brine not already combined as the chlorid, and crystallizing out the potassium chlorid.

8. The process of treating solutions of natural brines containing potassium chlorid and carbonates, which comprises precipitating the carbonates with lime, concentrating the solution and adding during concentration sodium chlorid to furnish the chlorin radical for the potassium content not already combined as the chlorid, and crystallizing out the potassium chlorid.

9. The process of treating solutions of natural brines containing chlorids, sulfates and carbonates of potassium and sodium, which comprises precipitating the carbonates with lime, adding sodium chlorid to the solution in excess of the quantity required to furnish enough of the chlorin radical to satisfy the potassium content not already combined as the chlorid, concentrating and crystallizing out the potassium chlorid, and adding sodium sulfate to the mother-liquor to remove any remaining amount of potassium as sulfate.

10. The process of treating solutions of natural brines containing chlorids, sulfates and carbonates of potassium and sodium, which comprises precipitating the carbonates with lime, adding sodium chlorid to the solution in excess of the quantity required to furnish enough of the chlorin radical to satisfy the potassium content not already combined as the chlorid, concentrating the solution, and fractionally crystallizing out the potassium sulfate and potassium chlorid.

In testimony whereof, I affix my signature.

JOHN A. CULLEN.